United States Patent [19]

Siegers

[11] Patent Number: 5,106,638

[45] Date of Patent: Apr. 21, 1992

[54] PROCESS FOR DECOLORIZING AND DEMINERALIZING FRUIT JUICE AND MUST

[75] Inventor: Günter Siegers, Bergisch Gladbach, Fed. Rep. of Germany

[73] Assignee: Bayer Aktiengesellschaft, Leverkusen, Fed. Rep. of Germany

[21] Appl. No.: 656,351

[22] Filed: Feb. 15, 1991

[30] Foreign Application Priority Data

Feb. 22, 1990 [DE] Fed. Rep. of Germany ....... 4005579

[51] Int. Cl.$^5$ ................................................ A23L 2/36
[52] U.S. Cl. .................................. 426/271; 426/330.5; 426/599
[58] Field of Search .............. 426/271, 330.5, 254, 426/599, 330.4

[56] References Cited

U.S. PATENT DOCUMENTS

| | | | |
|---|---|---|---|
| 2,667,417 | 1/1954 | Delmousee | 426/271 |
| 3,437,491 | 4/1969 | Peterson | 426/271 |
| 4,260,388 | 4/1981 | Mirabel | 426/250 |
| 4,288,462 | 9/1981 | Hou | 426/330.4 |
| 4,500,556 | 2/1985 | Langston | 426/250 |
| 4,522,836 | 6/1985 | Dechow | 426/599 |
| 4,666,721 | 5/1987 | Norman | 426/599 |
| 4,676,988 | 6/1987 | Efstathiou | 426/271 |
| 4,775,541 | 10/1988 | Brown | 426/330.4 |
| 4,898,742 | 2/1990 | Shrikhande | 426/592 |

*Primary Examiner*—Carolyn Paden
*Attorney, Agent, or Firm*—Sprung Horn Kramer & Woods

[57] ABSTRACT

A process for demineralizing and decolorizing fruit juice and must is disclosed. Here fruit juice and must is chromatographed on strongly acid cation exchangers in the salt form.

5 Claims, 3 Drawing Sheets

PROCESS FOR DECOLORIZING AND DEMINERALIZING FRUIT JUICE AND MUST

BACKGROUND OF THE INVENTION

The invention relates to a new process for demineralizing and decolorizing fruit juice and must.

The production of sugars from fruit juices, in particular from grape juice and must, on a large industrial scale is gaining increasing importance. Depending on the climatic conditions in the various growing regions, fruit juice or must contains, for example, 17 to 20% by weight of sugar, 0.6% by weight of protein, about 0.3% by weight of fats and about 130 mequivalents of salts/l. The fruit juices or musts moreover have a greater or lesser content of dyestuffs, predominantly anthocyanins.

To produce sugar from fruit juices, for example pear juice and grape juice or must, these have to be decolorized and demineralized. The juices or musts have to date been demineralized by ion exchange, that is to say by treatment with strongly acid cation exchangers in the H+ form and weakly basic anion exchangers in the amine form. During the demineralization, or more precisely when flowing through the weakly basic anion exchangers, decolorization occurs at the same time as the absorption of the acids.

This demineralization and decolorization by ion exchange has the disadvantage that the dyestuffs are absorbed almost irreversibly onto the weakly basic anion exchangers and are therefore removed to only a small degree during regeneration with sodium hydroxide solution and thus block the anion exchanger groups which participate in the exchange. That is to say, the usable capacity of the weakly basic anion exchangers employed in this process decreases greatly after only a few working cycles; in addition, the washing out properties of the anion exchangers deteriorate.

To protect the weakly basic anion exchangers, the demineralization filters of strongly acid cation exchangers and weakly basic anion exchangers have already been preceded with filters packed with specific strongly basic decolorizing resins. However, these decolorizing resins were also deactivated so severely by the dyestuffs after only a few working cycles that they had to be purified by expensive treatment with oxidizing agents.

This means that the known processes for decolorizing and demineralizing fruit juices, in particular grape juice and must, by ion exchange have the disadvantage that the lives of the anion exchangers are too short and/or they require expensive processes for purification of the anion exchangers.

Surprisingly, it has been found that decolorization and demineralization of fruit juices, such as pear juice and grape juice and must, can be achieved effortlessly and without consumption of ion exchangers if the juice or must is chromatographed on charged cation exchangers. Surprisingly, it has been found that during chromatography of the juices on strongly acid charged cation exchangers, the dyestuffs are not held in the ion exchanger but migrate virtually quantitatively with the salts into the electrolyte first runnings. In contrast to the separation of molasses into sugars and non-sugars by the electrolyte first runnings process, in which only incomplete removal of the dyestuffs from the sugar is achieved, when the process is used for the separation of sugars and non-sugars (salts) in fruit juices, almost quantitative separation of the dyestuffs from the sugars is achieved.

SUMMARY OF THE INVENTION

The invention thus relates to a process for demineralizing and decolorizing fruit juices, in particular pear juice and grape juice and must, with the aid of ion exchangers; the process is characterized in that the fruit juices (musts) are chromatographed on strongly acid cation exchangers in the salt form.

DESCRIPTION OF THE PREFERRED EMBODIMENTS

Chromatographing means loading (charging) the charged cation exchanger, that is to say the cation exchanger in the salt form, with a certain amount, determined beforehand by preliminary experiments, of fruit juice (must) at a constant flow rate (flow direction: from the top downwards) and then eluting the loaded cation exchanger by passing in demineralized water, likewise at a constant flow rate and a flow direction from the top downwards.

Figure 1:
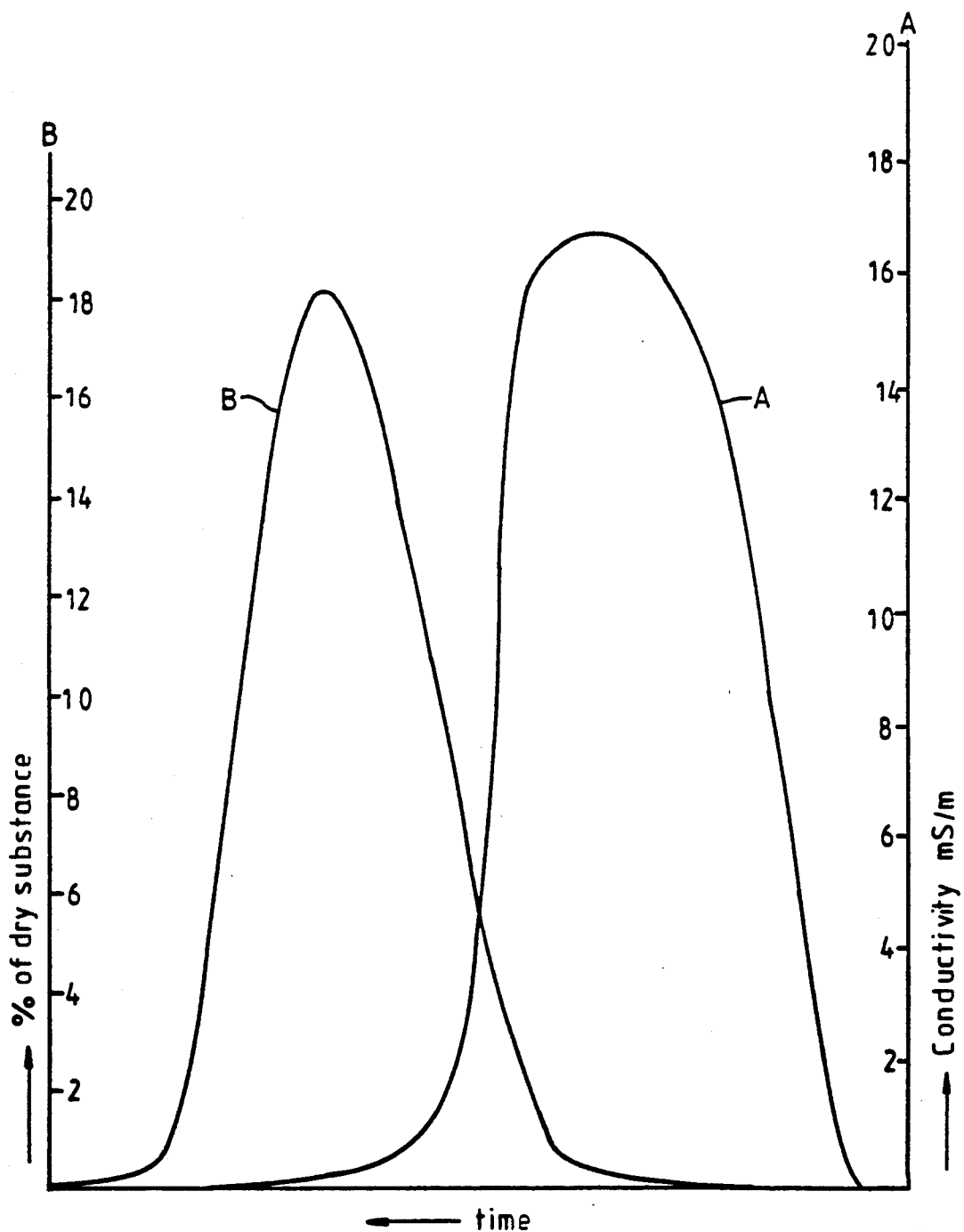
Figure 2:
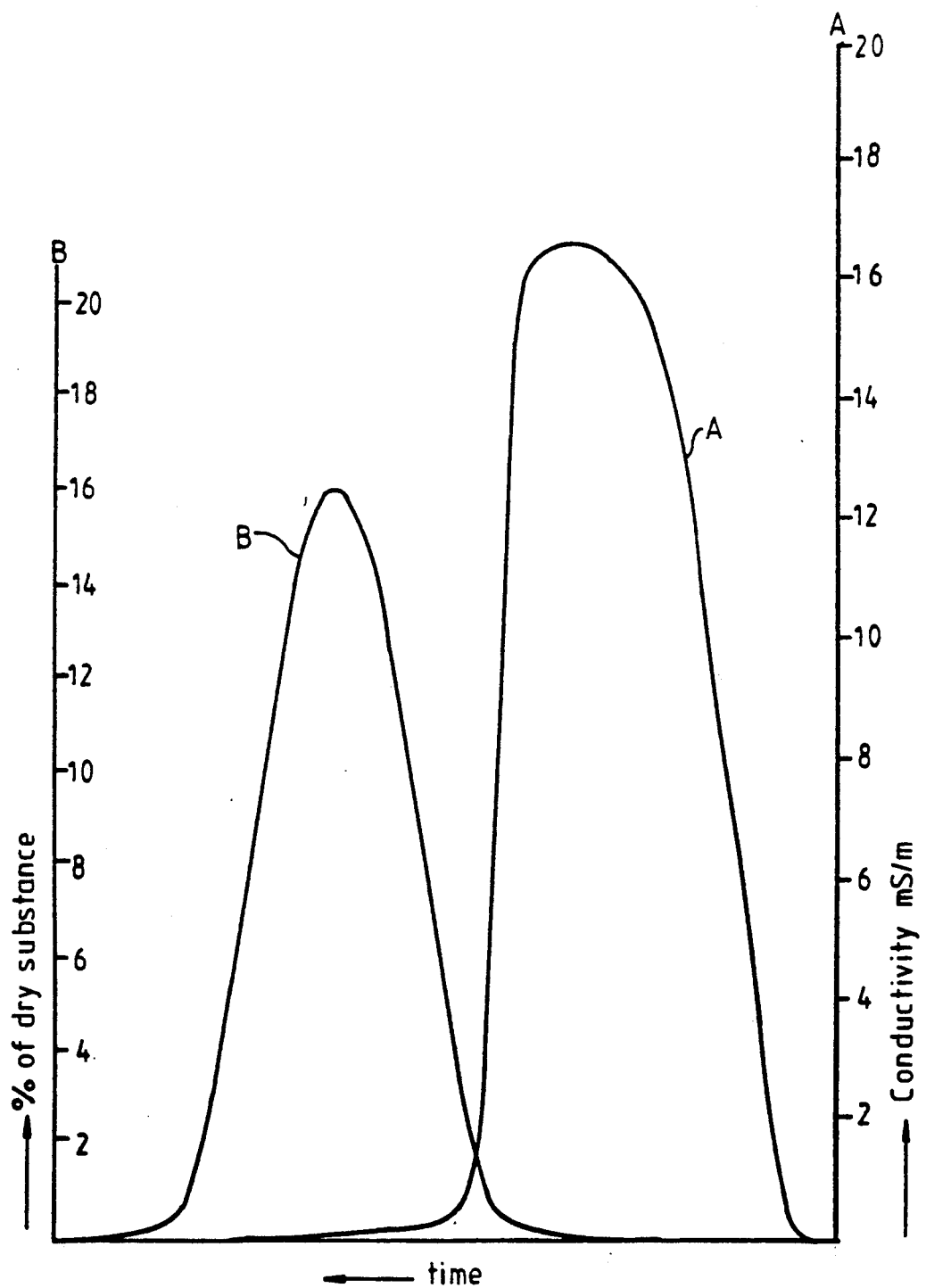
Figure 3:
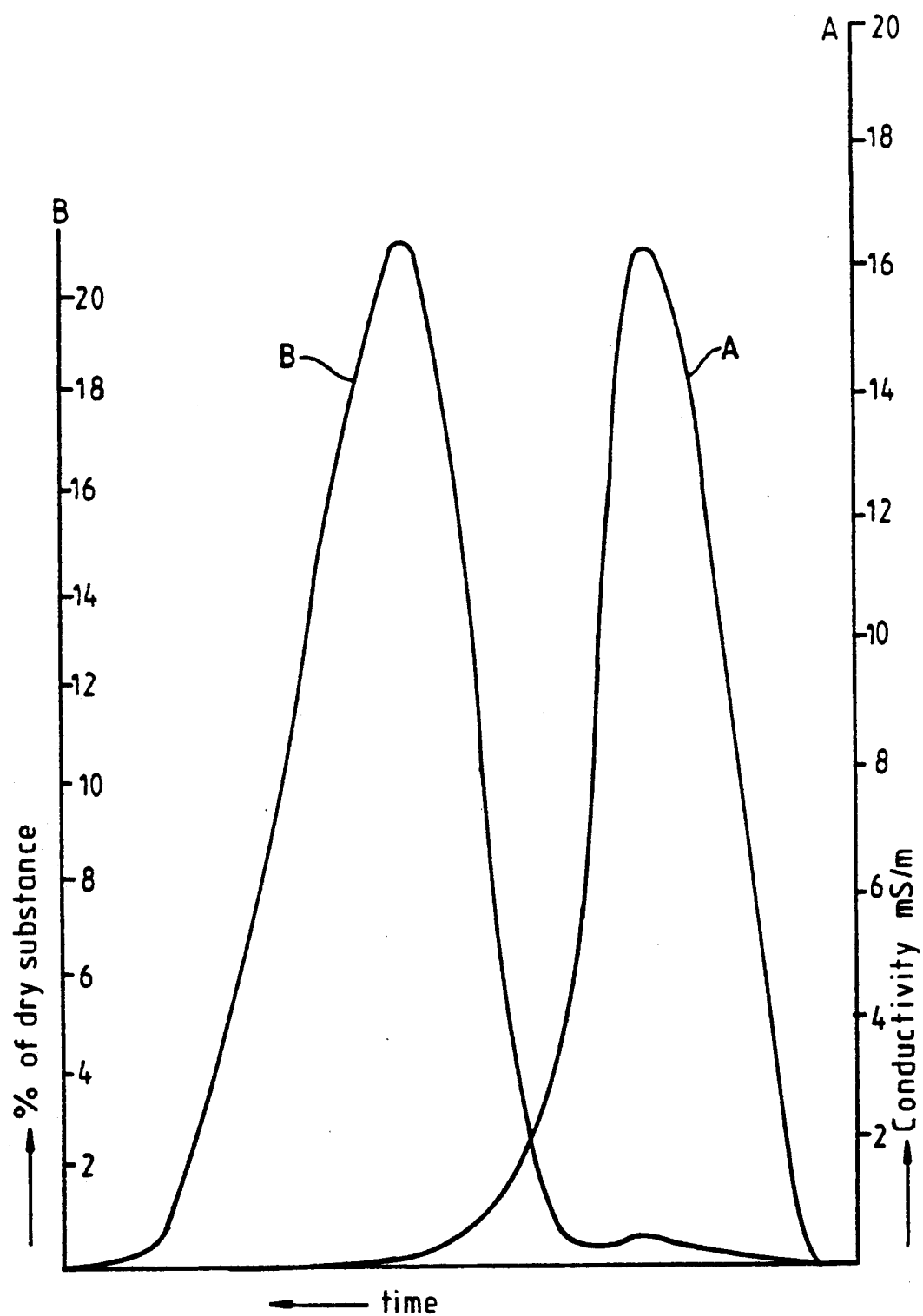

By simultaneous determination of the electrical conductivity and refractive index (→ converted into per cent by weight of dry substance) in the eluate (discharge), it is ascertained when the electrolyte first runnings appear in the eluate (the conductivity values in the eluate increase), when the electrolyte is washed out of the column (conductivity values fall again to zero, the refractive index (content of dry substance in per cent by weight) increases) and when the sugar fraction appears in the discharge (conductivity of the eluate falls towards zero, the refractive index (content of dry substance) increases) (see FIG. 1, 2 and 3).

As soon as the value of the refractive index of the eluate has fallen again to zero, that is to say the sugar fraction has also been discharged, the operating cycle starts again with the loading of the cation exchanger with fruit juice (must).

The change of fractions in the eluate is usually carried out at the intersection of the elution curve of the electrolyte (curve A in FIG. 1, 2 and 3) with the elution curve of the non-electrolyte (curve B in FIG. 1, 2 and 3). However, the time at which the change in fractions is carried out can also be shifted from the intersection of the electrolyte and non-electrolyte curve into the electrolyte or non-electrolyte region, depending on the pure product requirements.

In the preliminary experiments to determine the amount of fruit juice to be applied to the cation exchanger, the capacity of the cation exchanger used (in g of dry substance/l of resin) for the amount of sugar to be absorbed from the fruit juice is determined. In the process according to the invention, an amount of fruit juice is added to the strongly acid cation exchangers such that about 30 to 80 g of the dry substance contained in the juice are present per 1 l of cation exchanger. The degree of demineralization and decolorization depends on the ratio of cation exchanger/amount of dry substance applied in the sense that as the degree of charging increases (amount of dry substance per liter of resin and cycle), the degree of demineralization and decolorization decrease. For economic reasons, degrees of demineralization and decolorization of 90 to 95% are in general regarded as satisfactory.

Chromatographing, that is to say charging and eluting, is preferably carried out at elevated temperatures, for example at 40° to 90° C., particularly preferably 50° to 80° C., to accelerate the establishing of equilibrium.

Weakly crosslinked gelatinous cation exchangers based on polystyrenesulphonic acid, for example polystyrenesulphonic acids crosslinked with 2 to 12% by weight, preferably with 4 to 8% by weight, of divinylbenzene, are preferably used as the strongly acid cation exchangers.

The strongly acid cation exchangers can be used in the $Na^+$, $K^+$ or $Ca^{2+}$ form for the process according to the invention. Since the fruit juices (musts) predominantly contain potassium salts (for example potassium tartrate), it is advisable to use a cation exchanger charged with $K^+$. Trans-charging of the cation exchanger during the chromatography is avoided in this manner, and a regeneration is spared. To avoid trans-charging of the cation exchanger in the $K^+$ form by the small amounts of $Mg^{2+}$ and $Ca^{2+}$ ions contained in the juice, it is advisable to precede the chromatography filter with a cation exchanger charged with $K^+$ ions for trans-mineralization of the juice.

The content of dry substance in the fruit juices and musts which can be demineralized and decolorized according to the invention can be between 10 and 70% by weight, preferably between 10 and 50% by weight.

In addition to the advantage that it operates with only one cation exchanger and requires no anion exchanger, the process according to the invention has the further advantage that the cation exchanger requires no regeneration and that therefore no pollution of the effluent with regenerating chemicals occurs with this exchanger, in contrast to demineralization by ion exchange.

EXAMPLE 1

An ion exchanger filter (glass tube closed at the lower end with a plate which is permeable to liquid, internal diameter of the glass tube: 25 mm, height of the glass tube: 950 mm) is loaded with 440 ml of a strongly acid gelatinous cation exchanger (polystyrenesulphonic acid crosslinked with 4% by weight of divinylbenzene) in the $K^+$ form (filling height: 893 mm) and with 95.8 ml of a must prepared from rosé grapes (must temperature: 60° C.) at a linear flow rate of 1 m/hour (flow direction: from the top downwards) (content of dry substance (DS) in the must: 21.1% by weight; degree of charging: 50 g of dry substance/l of cation exchanger). The cation exchanger is then loaded with demineralized water (water temperature: 70° C.) at a linear flow rate of likewise 1 m/hour. The composition of the eluate discharged from the column is monitored with the aid of its electrical conductivity and its refractive index (=dry substance content); at the time at which the conductivity curve A intersects with the dry substance curve B, the eluate fraction is changed.

The two fractions obtained in this manner are then analysed for their content of dry substance, salt and colour.

The values found in the analysis are compared with the corresponding values of the crude juice in the table below.

TABLE 1

|  | Crude juice | Electrolyte fraction | Non-electrolyte fraction |
|---|---|---|---|
| pH | 7.31 | 7.13 | 8.36 |
| Conductivity μS/cm |  | 7776 | 225 |
| $K_A$ 4.3 mmol/l | 40.75 | 25.84 | 1.73 |

TABLE 1-continued

|  | Crude juice | Electrolyte fraction | Non-electrolyte fraction |
|---|---|---|---|
| $K_A$ 8.2 mmol/l | — | — | 0.1 |
| $K_B$ 8.2 mmol/l | 7.54 | 4.92 | — |
| TH ($\frac{1}{2}Ca^{2+}$ + $\frac{1}{2}Mg^{2+}$) mmol/l | 0 | 0 | 0 |
| strong anions mmol/l | 87.02 | 65.3 | 1.2 |
| total salt mmol/l | 127.77 | 91.14 | 2.93 |
| colour, extinction/cm, 420 nm | 1.196 | 0.729 | 0.031 |
| juice: concentration, % DS | 21.1 | 2.5 | 12.5 |
| amount/cycle, g DS absolute | 22.0 | 3.7 | 18.36 |
| electrolyte, g absolute |  | 1.3 |  |
| Non-electrolyte, g absolute |  | 2.4 |  |
| ml/cycle absolute | 95.8 | 146 | 146 |

DS = dry substance
TH = total hardness

The comparison of the values shown for the crude juice and non-electrolyte fraction (sugar fraction) shows a degree of demineralization of 97.7% and a degree of decolorization of 97.4% for the non-electrolyte fraction. The concentration of the non-electrolyte fraction has fallen from 21.1% of DS to 12.5% by the chromatography. The amount of substance (dry substance) applied to the cation exchanger is distributed as follows: 3.7 g are found in the electrolyte fraction and 18.36 g are found in the non-electrolyte fraction. The 3.7 g of dry substance contained in the electrolyte fraction are composed of 1.3 g of electrolyte and 2.4 g of non-electrolyte.

After the elution with water, the cation exchanger is loaded again with 95.8 ml of must as described and the operating cycle is repeated as described. This operating cycle also gives an electrolyte fraction and a non-electrolyte fraction, the composition of which corresponds to the composition shown in Table 1.

The operating cycle was repeated a total of 100 times without a change being found in the composition of the resulting fractions.

In another experiment, the cation exchanger was loaded with only 77 ml of must, that is to say with 40 g of dry substance/l of cation exchanger. The chromatography was carried out under the conditions described above (temperature, flow rates and the like). The changing of the eluate fraction was also carried out at the intersection of the electrolyte and non-electrolyte curve (see FIG. 2).

In Table 2 below, the values found on analysis of the resulting electrolyte fraction and non-electrolyte fraction are compared with the corresponding values of the must applied.

The comparison of the values shown for the crude juice and non-electrolyte fraction (sugar fraction) shows a degree of demineralization of 99.5% and a degree of decolorization of 98.8% for the non-electrolyte fraction. The concentration of the non-electrolyte fraction falls from 21.1% of DS to 10.6% by the chromatography. The amount of substance (dry substance) applied to the cation exchanger is distributed as follows: 2.56 g are found in the electrolyte fraction and 15.03 g are found in the non-electrolyte fraction. The 2.56 g of dry substance contained in the electrolyte fraction are composed of 1.05 g of electrolyte and 1.52 g of non-electrolyte.

TABLE 2

| | Crude juice | Electrolyte fraction | Non-electrolyte fraction |
|---|---|---|---|
| pH | 7.31 | 7.06 | 8.5 |
| Conductivity μS/cm | | 6975 | 99.5 |
| $K_A$ 4.3 mmol/l | 40.75 | 18.93 | 0.215 |
| $K_A$ 8.2 mmol/l | — | — | 0.03 |
| $K_B$ 8.2 mmol/l | 7.54 | 2.33 | 0 |
| TH ($\frac{1}{2}Ca^{2+} + \frac{1}{2}Mg^{2+}$) mmol/l | 0 | 0 | 0 |
| strong anions mmol/l | 87.02 | 61.5 | 0.42 |
| total salt mmol/l | 127.77 | 80.43 | 0.635 |
| colour, extinction/cm, 420 nm | 1.196 | 0.711 | 0.015 |
| juice: concentration, % DS | 21.1 | 1.2 | 10.6 |
| amount/cycle, g DS absolute | 17.6 | 2.56 | 15.03 |
| electrolyte, g absolute | — | 1.05 | |
| Non-electrolyte, g absolute | — | 1.52 | |
| ml/cycle absolute | 77 | 130 | 138 |

DS = dry substance
TH = total hardness

EXAMPLE 2

The ion exchange filter described in Example 1 is filled with 440 ml of a strongly acid gelatinous cation exchanger (polystyrenesulphonic acid crosslinked with 6% by weight of divinylbenzene) in the K+ form and loaded with 44 ml of a pear juice concentrate (content of dry substance: 50%) at a temperature of 60° C. at a linear flow rate of 1 m/hour (flow direction: from the top downwards). The cation exchanger is then loaded with demineralized water (water temperature: 60° C.) at a linear flow rate of likewise 1 m/hour (flow direction: from the top downwards). The composition of the eluate discharged from the column is monitored with the aid of its electrical conductivity and its refractive index (=dry substance content). The eluate fraction is changed at the time at which the conductivity curve A intersects with the dry substance curve B (see FIG. 3). The two fractions thus obtained are then analysed for their content of salt, dry substance and colour (see Table 3).

The comparison of the values shown for the crude juice and non-electrolyte fraction (sugar fraction) shows a degree of demineralization of 96.4% and a degree of decolorization of 98.5% for the non-electrolyte fraction.

TABLE 3

| | Crude juice | Electrolyte fraction | Non-electrolyte fraction |
|---|---|---|---|
| pH | 5.11 | 5.43 | 6.72 |
| Conductivity μS/cm | 15344 | 10803 | 308 |
| $K_A$ 4.3 mmol/l | 146.7 | 48.1 | 1.42 |
| $K_A$ 8.2 mmol/l | — | — | — |
| $K_B$ 8.2 mmol/l | 79.2 | 25.4 | 1.6 |
| TH ($\frac{1}{2}Ca^{2+} + \frac{1}{2}Mg^{2+}$) mmol/l | 22.5 | 0 | 0 |
| strong anions mmol/l | 283.14 | 108 | 4.6 |
| total salt mmol/l | 429.8 | 156 | 6.02 |
| colour, extinction/cm, 420 nm | 2.72 | 0.544 | 0.04 |
| juice: concentration, % DS | 50 | 2.90 | 12.9 |
| amount/cycle, g DS absolute | 22 | 3.20 | 18.71 |
| electrolyte, g absolute | 1.4 | 1.20 | 0.05 |
| non-electrolyte, g absolute | 20.6 | 2.0 | |
| ml/cycle absolute | 35.62 | 110 | 145 |

DS = dry substance
TH = total hardness

I claim:

1. A process for demineralizing and decoloring a fruit juice which comprises subjecting said fruit juice to fractional chromatography with only a strongly acid cation exchanger in the Na+, K+ or $Ca^{2+}$ salt form, thereby to render the juice dimineralized and decolored.

2. The process according to claim 1, wherein the exchanger is in the form of a column, the process comprising passing fruit juice and the water into the column, collecting the water eluate form the column in fractions, and then repeating the process multiple times on the same column.

3. The process according to claim 1, wherein the exchanger comprises gelatinous polystyrenesulphonic acid crosslinked with 2 to 12% by weight of divinylbenzene.

4. The process according to claim 1, wherein the exchanger in the salt form is loaded with an amount of fruit juice such that 30 to 100 g of dry substance of the juice are present per liter of exchanger.

5. The process according to claim 1, wherein the contact is effected at about 40° to 90° C.

* * * * *